Patented July 25, 1939

2,167,381

UNITED STATES PATENT OFFICE 2,167,381

RUBBER HYDROHALIDE-SALICYLIC ACID ESTER COMPOSITIONS

Herbert A. Winkelmann and Eugene W. Moffett, Chicago, Ill., assignors to Marbon Corporation, Chicago, Ill., a corporation of Delaware No Drawing. Application November 9, 1936, Serial No. 110,013

8 Claims. (Cl. 106—23)

This invention relates to halogen containing rubber derivative compositions. More particularly it relates to compositions of rubber hydrohalides and esters of salicylic acid and is especially concerned with those esters which retard light disintegration.

Halogen containing rubber derivatives such as rubber hydrochlorides become brittle so rapidly on exposure to sunlight that for some purposes such as for wrapping, sheets of rubber hydrochloride are at a disadvantage compared to other flexible sheets such as viz. regenerated cellulose sheets which remain flexible over more prolonged periods of time. Plasticizers and light inhibitors have been added to the rubber hydrochloride to maintain flexibility and inhibit the deleterious effect of light. Terpenes such as pine oil, pinene, limonene and dipentene, likewise amines such as hexamethylene tetramine and dicyclohexylamine have been used. The terpenes have been objectionable because of odor and taste, while the amine compounds are not as compatible as is generally desired, have little or no plasticizing action and, in general, have an objectionable odor and taste.

We have found that menthyl salicylate will retard light disintegration of rubber hydrohalides to a substantial extent and maintain the flexibility of films made therefrom over prolonged periods of time such as may be present in the commercial use of wrapping sheets. Menthyl salicylate is compatible with rubber hydrochloride in high proportions, is a plasticizer, has practically no odor or objectionable taste, does not promote heat disintegration, and causes little or no discoloration during exposure of the composition to sunlight. B naphthyl salicylate and tetrahydrofurfuryl salicylate act similar to menthyl salicylate.

The following example and table giving the results of tests will illustrate our invention:

Solutions of saturated permanently amorphous rubber hydrochloride in benzol were prepared, having a concentration of 9% rubber hydrochloride and 3% inhibitor by weight. Transparent thin flexible films were obtained by casting the solution on a smooth surface, drying and removing the resulting films. Films so made were tested in a "standardized daylight" Fadeometer and gave results as follows, the time in hours being the time in which brittleness first became apparent:

*Table*

| Inhibitor | Color after 24 hours | Final color | Time |
|---|---|---|---|
| None | Clear | Yellow | 48 |
| Menthyl salicylate | Sl. yellow | do | 72 |
| Tetrahydrofuryl salicylate | Clear | Sl. yellow | 76 |
| B naphthyl salicylate | Yellow | Deep yellow | 52 |

The mechanism of the action of our inhibitors is not entirely understood. They are not antacids and do not maintain the rubber hydrohalides in that neutral condition which has been stated as desirable for retarding decomposition. The action of our compounds is believed to be a screening or absorption effect. It is believed that they absorb light of wave lengths which are particularly effective in promoting disintegration of halogen containing rubber derivatives. At the same time their lack of odor, taste and color make them particularly adaptable for use in films of rubber hydrochloride which are to be used as wrapping sheets, apparel and the like. Their plasticizing action enhances the inhibiting effect and the good compatibility of these materials make it possible to incorporate as high as 10% and more without blooming. However, in amounts as low as ½% their inhibiting effect is pronounced and it is ordinarily not desirable to use more than 1 to 3% by weight on the basis of the rubber hydrochloride.

We have further discovered that the organic esters of salicylic acid in general are good plasticizers for rubber hydrohalide. Among the salicylates which have been found to be good plasticizers are methyl salicylate, butyl salicylate, isopropyl salicylate, menthyl salicylate, tetrahydrofurfuryl salicylates, and B naphthyl salicylate.

We claim:

1. A composition of matter comprising a rubber hydrohalide and an ester of salicylic acid.

2. A composition of matter comprising a rubber hydrochloride and methyl salicylate.

3. A composition of matter comprising a rubber hydrochloride and tetrahydrofurfuryl salicylate.

4. A composition of matter comprising a rubber hydrochloride and naphthyl salicylate.

5. As a new article of manufacture, a thin, flexible sheet composed of a rubber hydrochloride and an ester of salicylic acid of such character and in such amount as to retard light disintegration of the rubber hydrochloride.

6. As a new article of manufacture, a thin, flexible sheet composed of a rubber hydrochloride and methyl salicylate in such amount as to retard light disintegration of the rubber hydrochloride.

7. A composition of matter comprising a rubber hydrochloride and a substance selected from the group consisting of methyl salicylate, naphthyl salicylate, tetrahydrofurfuryl salicylate, methyl salicylate, butyl salicylate and isopropyl salicylate.

8. A composition of matter suitable for the production of flexible film comprising a rubber hydrochloride and a minor proportion of an ester of salicylic acid.

HERBERT A. WINKELMANN.
EUGENE W. MOFFETT.

CERTIFICATE OF CORRECTION.

Patent No. 2,167,381.                                                     July 25, 1939.

HERBERT A. WINKELMANN, ET AL.

It is hereby certified that error appears in the printed specification of the above numbered patent requiring correction as follows: Page 1, second column, lines 43 and 55, and page 2, first column, line 5, claims 2, 6 and 7 respectively, for the word "methyl" read menthyl; and that the said Letters Patent should be read with this correction therein that the same may conform to the record of the case in the Patent Office.

Signed and sealed this 19th day of September, A. D. 1939.

Henry Van Arsdale.

(Seal)                                            Acting Commissioner of Patents.